Sept. 15, 1964 R. P. THORN 3,149,265

DAMPED ELECTRIC CIRCUIT BOARD

Filed Feb. 21, 1962

INVENTOR.
Richard P Thorn
BY
Ralph Hammar
Attorney

United States Patent Office 3,149,265

Patented Sept. 15, 1964

3,149,265

DAMPED ELECTRIC CIRCUIT BOARD

Richard P. Thorn, Erie, Pa., assignor to Lord Manufacturing Company, Erie, Pa., a corporation of Pennsylvania Filed Feb. 21, 1962, Ser. No. 174,875
5 Claims. (Cl. 317—100)

This invention is a circuit enclosure intended to protect electric circuit components from high frequency vibrations. Instead of mounting the components on the board, the components are placed in pre-molded cavities in a laminate of structural plates and viscoelastic damping material.

Figure 1:
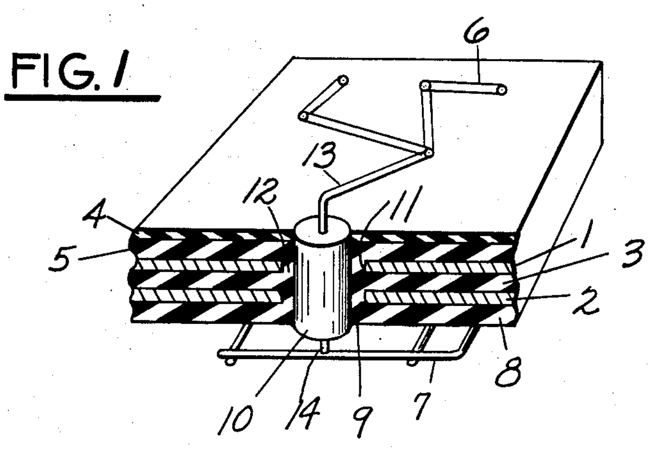
Figure 2:
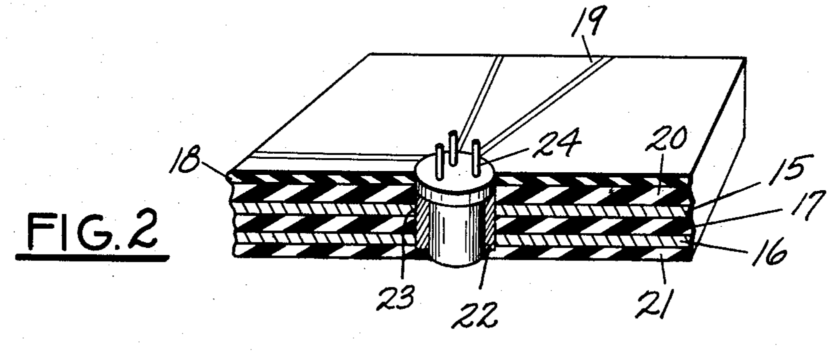
Figure 3:
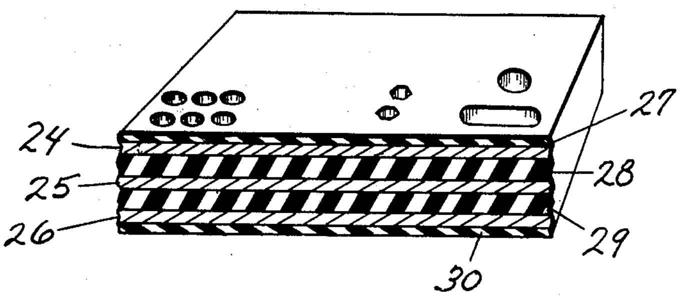

In the drawing, FIG. 1 is a fragmentary section through a board showing a tubular component connected on one side of the board to printed wiring and on the opposite side of the board to welded wires, FIG. 2 is a similar section showing a transistor received in a metal shell or socket for dissipating the heat, and FIG. 3 is a perspective illustrating possible arrangements of the component receiving cavities.

The enclosure has a plurality of plates or layers 1 and 2 of structural material such as aluminum, fiberglass reinforced plastic, etc. with adjacent layers bonded to an intermediate layer 3 of viscoelastic material having high damping or internal friction and a modulus of elasticity low compared to the structural material. Viscoelastic materials are well known under chemical and proprietary names and the choice for any particular environment is a matter of engineering. The thickness of the layers 1, 2 and 3 is a matter of calculation for the load to be carried, the frequencies encountered and the damping desired. Thicknesses varying from .005 inch to ⅛ inch have been used and this range is by way of example and not by way of limitation. The number of layers making up the basic enclosure may be increased if desired.

On the upper surface of the enclosure is an outer skin of insulating material 4 which is bonded to a viscoelastic layer 5 in turn bonded to the upper surface of the layer 1. The skin 4 carries a printed wiring pattern 6. On the lower surface of the enclosure is a grid of welded wiring 7 resting on a layer 8 of viscoelastic material bonded to the outer or under surface of the structural plate 2. At suitable locations in the enclosure are cavities or sockets 9 having an inside diameter in the as molded condition slightly smaller than the outside diameter of a component 10. When the enclosure is molded in one operation as shown, the cavities or sockets 9 extend through the outer skin 4 to permit insertion of the components. In the alternative, the skin 4 may be a separately manufactured printed wiring board added to the enclosure after the insertion of the components, in which case the openings in the skin 4 need only be large enough to receive the component leads. In fact it might be easier to solder the leads to the printed wiring if the openings in the skin 4 were only slightly larger than the component leads. The diameter of the cavity 9 is substantially less than the diameter of registering holes 11 in the structural plates 1 and 2 so that there is formed a skin 12 of viscoelastic material between the edges of the holes 11 and the bore of the cavity 9 which provides a friction grip on the inserted component and also provides a damping connection to the component which protects it from high frequency vibration. At the upper end the component lead 13 is connected to the printed wiring. At the lower end the component lead 14 is connected to the metal grid wiring. It will be understood that either form of wiring may be used on both sides or that wiring may be used on only one side.

In the enclosure shown in FIG. 2, there are metal plates 15 and 16 between which is sandwiched a layer 17 of viscoelastic material. A skin 18 of insulating material carrying printed wiring 19 is bonded to the upper side of the plate 15 by a viscoelastic layer 20. Bonding is not necessary. A viscoelastic layer 21 is bonded to the side of the plate 16. Prior to the molding operation during which all of the layers are bonded together, a metal shell 22 is inserted into registering openings 23 in good thermal conductive relation to the metal plates 15 and 16. The purpose of this shell is to provide a heat sink for a transistor 24 or other component inserted within the shell. During the molding operation, the viscoelastic layers 17, 20 and 21 are bonded to the outer surface of the shell and some of the elastomer flows between the shell and the openings 23 in the metal plates 15 and 16. The shell accordingly does not interfere with the damping. If desired, the inner surface of the shell 22 may have a coating of the elastomer to provide a grip on the component 24. The heat sink provided by the shell 22 in association with the metal plates 16 conducts heat away from the component which could interfere with its operation.

In FIG. 3 there is shown a circuit enclosure having three layers 24, 25, 26 of structural material and four layers 27, 28, 29, 30 of viscoelastic material. These are bonded together to form a damped laminate. In each of the layers there is one or more holes which are arranged in register with each other prior to molding. The shape of these holes is a matter of design and may be round, hexagonal or oval as illustrated, or of any other suitable design adapted to receive the components.

What is claimed as new is:

1. A circuit enclosure comprising a plurality of sheets of structural material with adjacent sheets bonded to opposite sides of an intervening layer of viscoelastic material of high internal friction and low modulus of elasticity compared to the structural material, said structural sheets and the intermediate viscoelastic layer having registering openings therein, a tubular lining of viscoelastic material extending through and bonded to the edges of said openings and providing a component receiving socket.

2. A circuit enclosure comprising a plurality of sheets of metal with adjacent sheets bonded to opposite sides of an intervening layer of viscoelastic material of high internal friction and low modulus of elasticity compared to the metal, coatings of viscoelastic material bonded to the outermost surface of said sheets, said sheets and the viscoelastic layer registering openings therein, a metal sleeve extending through said openings in good thermal conducting relation to the sheets and bonded to the viscoelastic layers, the metal sleeve providing a component receiving socket and serving as a heat sink.

3. A circuit enclosure comprising a plurality of sheets of structural material with adjacent sheets bonded to opposite sides of an intervening layer of viscoelastic material of high internal friction and low modulus of elasticity compared to the structural material, coatings of viscoelastic material bonded to the outermost surfaces of said sheets, said structural sheets and the viscoelastic layers having registering openings therein, a tubular lining of viscoelastic material extending through and bonded to the edges of said openings and providing a component receiving socket, and wiring on at least one of the coatings of viscoelastic material.

4. A circuit enclosure comprising a plurality of sheets of structural material with adjacent sheets bonded to opposite sides of an intervening layer of viscoelastic material of high internal friction and low modulus of elasticity compared to the structural material, said structural sheets and the intermediate viscoelastic layer having registering openings therein, a tubular lining of viscoelastic material extending through and bonded to the edges of said openings and providing a component receiving socket, a sheet of insulating material bonded to the outer surface of one of said structural sheets by a layer of viscoelastic material and having an opening registering with said socket, and printed wiring carried on the outer surface of said sheet of insulating material.

5. A circuit enclosure comprising a plurality of sheets of metal with adjacent sheets bonded to opposite sides of an intervening layer of viscoelastic material of high internal friction and low modulus of elasticity compared to the metal, coatings of viscoelastic material bonded to the outermost surfaces of said sheets, said sheets and the viscoelastic layers registering openings therein, a metal sleeve extending through said openings in good thermal conducting relation to the sheets and bonded to the viscoelastic layers, the metal sleeve providing a component receiving socket and serving as a heat sink, a sheet of insulating material bonded to the outer surface of one of said viscoelastic coatings, and printed wiring carried on the outer surface of said sheet of insulating material.

References Cited in the file of this patent

UNITED STATES PATENTS 2,902,628 Leno ---------------- Sept. 1, 1959
3,013,186 Jones ---------------- Dec. 12, 1961